Patented Nov. 4, 1952

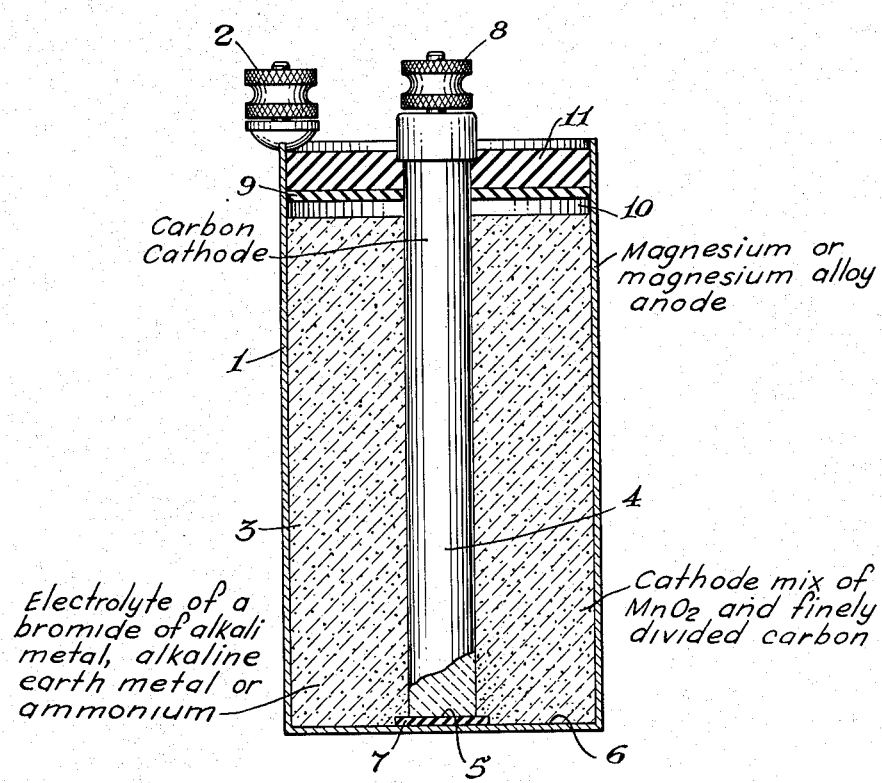

2,616,940

UNITED STATES PATENT OFFICE 2,616,940

PRIMARY CELL

Raymond W. Reid, Sanford, Mich., assignor to The Dow Chemical Company, Midland, Mich., a corporation of Delaware Application December 22, 1949, Serial No. 134,364

7 Claims. (Cl. 136—100)

The invention relates to an improved primary cell utilizing metallic magnesium as the anode material.

A particular object of the invention is to provide a primary cell of the "dry" or nonspillable type which is simpler in construction, higher in capacity, and exhibits more desirable voltage characteristics on discharging than conventional dry cells employing magnesium as the anode material and manganese dioxide as a depolarizer.

Dry or nonspillable cells employing magnesium or the magnesium-base alloys as the anode material are increasing in importance because of the availability and abundance of the anode material and the higher voltage and capacity of the cells compared to conventional zinc dry cells of the same size. The performance characteristics of the dry cells employing magnesium or magnesium-base alloy anodes with various formulations of aqueous electrolytes are set forth in a paper by R. C. Kirk and A. B. Fry, "Magnesium Dry Cells" which appeared in the "Journal of the Electrochemical Society," vol. 94, No. 6, Dec., 1948, pages 277 to 289, inclusive. In assembling these cells, the usual procedure is to form the anode material into a cup or "battery can" which constitutes one of the electrodes of the cell as well as the container holding the cathode elements and electrolyte. The cathode mix consists of manganese dioxide having intimately mixed with it usually between about 5 and 15 per cent of finely-divided carbon, such as acetylene black, by weight. The mixture is moistened with enough electrolyte to make it moldable and the moldable mixture is formed into "bobbins" around a central electrode in the form of a rod of carbon or graphite. These bobbins are simply cylindrical moldings somewhat smaller than the battery can and are inserted into the cans after they are lined with starch paste of gelled electrolyte or a porous nonconductor, such as cloth or paper, to keep the bobbin from touching the can. In some instances, the cathode mix is introduced into the lined cans without previously forming the mix into a bobbin, the molding taking place in the lined can. In such instances, after placing the cathode mix in the can, the electrode of a carbon or graphite rod is pushed centrally into the cathode mix as the other electrode. These constructions are similar to those used in the conventional zinc dry cell in which the cathode mix or bobbin is kept separate from the zinc can by a porous material, such as paper or cloth moistened with electrolyte.

I have now made the discovery that by employing a manganese dioxide depolarized cathode mix with a magnesium or magnesium alloy anode in assembling the aforesaid type of dry or nonspillable cell having an aqueous electrolyte, it is not necessary to prevent the cathode mix from touching the anode material. By allowing the cathode mix to come into direct contact with the inside of the battery can, for example, I am thereby enabled to eliminate the use of a porous liner or spacer material between the cathode mix and the magnesium or magnesium alloy anode. As a consequence of eliminating this feature of conventional dry cell construction, I have effected important economies of dry cell manufacture. In addition, there is obtained the surprising result of a marked increase in capacity or output of electrical energy compared to that of similar cells in which the cathode mix is separated from the anode with a conventional spacer material.

The invention may be further explained in connection with the accompanying drawing in which the single figure is a diagrammatic vertical section of a form of primary cell embodying the invention.

As shown, the cell illustrated is contained in and comprises the can 1 formed of magnesium or magnesium-base alloy. The can also serves as the anode of the cell and may be provided with a binding post 2. Placed directly in the can is the cathode mix 3 so that the mix is in direct contact with the inside of the can. A carbon or graphite rod 4 is positioned centrally in the mix which is tamped around the rod so as to make electrical contact therewith. The lower end 5 of the rod is spaced apart from the inside of the bottom 6. As a safety feature ensuring that the rod does not accidentally touch the bottom of the can, an insulating washer 7 may be interposed between the lower end of the rod and the bottom of the can, as shown. The top of the electrode 4 may be provided with a binding post 8. An insulating washer, e. g. an annulus of cardboard 9 is placed over the top of the cathode mix 3 leaving an air space 10. The washer is covered with sealing wax 11.

As to the electrolyte, there may be used any of the alkali or alkaline earth metal bromides, preferably either magnesium bromide or strontium bromide, dissolved in water in amounts of from about 100 grams per liter up to saturating amounts. A generally suitable concentration is between about 250 and 350 grams per liter. It is generally desirable to include in solution in the electrolyte a small amount of a soluble chromate of an alkali, alkali earth metal or ammonium. These chromates tend to reduce open circuit anode corrosion and thus prolong shelf life.

In assembling a cell, the cathode mix of manganese dioxide and finely-divided carbon may be moistened with the electrolyte in amount sufficient to render the mixture moldable and the moistened mixture molded into a cylindrical form or bobbin, around the central electrode, that will fit into the battery can easily. If desired, the moistened mixture may be introduced into the can directly without first forming a mold or bobbin, leaving room for the central electrode 4 which may be inserted into the cathode mix after it is in the can. The cathode mix is then tamped tightly in the annular space between the central electrode and inside of the can so that the mix makes direct contact with both the can 1 and the electrode 4, thus in effect short circuiting the cell. After tamping the cathode mix into the can and around the electrode, a cardboard washer 9 is inserted and then molten sealing wax may be poured over the top of the washer to form the sealing cover 11.

Although the cathode mix short circuits the cell, I have found, that this effect is only temporary and the cell quickly functions to produce a normal potential difference between its terminals that remains longer at a comparatively high value while discharging than similar cells in which the cathode mix is spaced apart from the insides of the can as in conventional cell construction.

As illustrative of the foregoing cell, the following is cited: A cell, No. 1, was made in size "D," the can being drawn from a magnesium-base alloy having the nominal composition of 3 per cent Al, 1 per cent Zn, 0.2 per cent Mn, the balance being magnesium. The cathode mix consisted of manganese dioxide 90 parts and acetylene black 10 parts, intimately mixed. The electrolyte was a water solution containing 300 grams of magnesium bromide ($MgBr_2.6H_2O$) per liter and 10 grams of ammonium chromate per liter. The cathode mix was moistened with the electrolyte in the proportion of 380 c. c. of electrolyte per 1000 grams of cathode mix. The can was charged with 50 grams of the moistened mix to which an additional 7 grams of the electrolyte were added. A carbon electrode was pushed into the mix in the can and the mix tamped in place. A paper washer was placed over and spaced from the top of the mix and the sealing wax was poured into the can over the washer to seal the cell. On being discharged continuously through a 7.5 ohm resistance 36 hours elapsed before the voltage dropped to 0.9. For comparison, a similar cell (No. 2) was made in which the cathode mix was of the same composition but separated from the can by a lining of starch paste as in conventional cell construction. On being continuously discharged through a resistance of 7.5 ohms only 19.5 hours elapsed before the voltage of the cell dropped to 0.9 volt.

Another cell, No. 3, made similarly to No. 1 showed a voltage of 1.12 while discharging after continuously discharging for 24 hours through a 7.5 ohm resistance. After a rest period of 24 hours, the closed circuit (5 ohms) voltage was 1.4 volts. After a further rest period of 16 days, the closed circuit (5 ohms) voltage was 1.4 volts.

Further examples of unlined cells of the invention in which the cathode mix was composed of manganese dioxide having about 10 per cent by weight of acetylene black in admixture are set forth in the following table. In making up the cells, a standard D size can formed of a magnesium-base alloy was used and the cathode mix was moistened with the electrolyte in the proportion of about 563 c. c. of electrolyte solution per 1000 grams of cathode mix.

Table

| Cell No. | G. P. L. Electrolyte in Water | | Hours of Continuous Discharge to 0.9 Volt Through 7.5 ohms |
|---|---|---|---|
| | Bromide | Inhibitor | |
| 4 | $300MgBr_2.6H_2O$ | $1(NH_4)_2CrO_4$ | 28.4 |
| 5 | $300MgBr_2.6H_2O$ | $1(NH_4)_2Cr_2O_7$ | 28.0 |
| 6 | $200NH_4Br$ | $1(NH_4)_2CrO_4$ | 34.25 |
| 7 | $200NH_4Br$ | $1(NH_4)_2Cr_2O_7$ | 36 |
| 8 | $300LiBr$ (15% $H_2O$) | $1(NH_4)_2CrO_4$ | 32 |
| 9 | $300LiBr$ (15% $H_2O$) | $1(NH_4)_2Cr_2O_7$ | 28.8 |
| 10 | $300SrBr_2.6H_2O$ | $1(NH_4)_2CrO_4$ | 26 |
| 11 | $300SrBr_2.6H_2O$ | $1(NH_4)_2Cr_2O_7$ | 28.8 |
| 12 | $300NaBr$ | $1(NH_4)_2CrO_4$ | 27 |
| 13 | $300NaBr$ | $1(NH_4)_2Cr_2O_7$ | 36 |
| 14 | $300MgBr_2.6H_2O$ | $10Li_2CrO_4$ | 25.6 |
| 15 | $300MgBr_2.6H_2O$ | $10Na_2CrO_4$ | 28.4 |
| 16 | $300MgBr_2.6H_2O$ | $10Ba_2CrO_4$ | 24.4 |
| 17 | $300MgBr_2.6H_2O$ | $10CaCrO_4$ | 25.7 |

It is to be understood that the foregoing description is illustrative rather than strictly limitative and that other embodiments of the new cell are possible within the spirit of the invention and the scope of the following claims.

I claim:

1. A primary cell having an anode formed of magnesium or a magnesium-base alloy, a cathode mix of manganese dioxide and finely-divided carbon, and an electrolyte comprising an aqueous solution of a bromide selected from the group consisting of the alkali and alkali earth metal and ammonium bromides, said cathode mix being moistened with said electrolyte and in direct contact with the anode.

2. A primary cell according to claim 1 having a soluble chromate dissolved in aqueous solution of the electrolyte, said soluble chromate being selected from the group consisting of the alkali and alkali earth metal chromates and bichromates.

3. A primary cell according to claim 1 in which the bromide is magnesium bromide.

4. A primary cell according to claim 1 in which the bromide is strontium bromide.

5. A primary cell according to claim 1 in which the bromide is ammonium bromide.

6. A primary cell according to claim 1 in which the bromide is lithium bromide.

7. A primary cell according to claim 1 in which the bromide is sodium bromide.

RAYMOND W. REID.

REFERENCES CITED

The following references are of record in the file of this patent:

UNITED STATES PATENTS

| Number | Name | Date |
|---|---|---|
| 1,901,588 | Eckstein | Mar. 14, 1933 |
| 2,050,172 | Gordon | Aug. 4, 1936 |
| 2,116,091 | Williams | May 3, 1938 |
| 2,343,194 | Lawson | Feb. 29, 1944 |
| 2,547,907 | Fry | Apr. 3, 1951 |
| 2,547,908 | Fry | Apr. 3, 1951 |

OTHER REFERENCES

Kirk et al., "Magnesium Dry Cells," Journal of the Electro-Chemical Society, vol. 94, No. 6, December 1948, pages 277–289.